United States Patent [19]

Moran

[11] 3,739,350

[45] June 12, 1973

[54] HIGH-SPEED DATA PROCESSING SYSTEM

[75] Inventor: Paul J. Moran, Waynesboro, Va.

[73] Assignee: General Electric Company, Waynesboro, Va.

[22] Filed: Sept. 24, 1971

[21] Appl. No.: 183,525

[52] U.S. Cl. .............................................. 340/172.5
[51] Int. Cl. .............................................. G06f 3/12
[58] Field of Search .................................. 340/172.5

[56] References Cited

UNITED STATES PATENTS

| | | | |
|---|---|---|---|
| 2,905,930 | 9/1959 | Golden | 340/172.5 |
| 3,107,344 | 10/1963 | Baker et al. | 340/172.5 |
| 3,242,469 | 3/1966 | Anderson et al. | 340/172.5 |
| 3,257,645 | 6/1966 | Lekven | 340/172.5 |
| 3,436,733 | 4/1969 | Pearce et al. | 340/172.5 |

*Primary Examiner*—Gareth D. Shaw
*Attorney*—Michael Masnik, Frank L. Newhauser, Oscar B. Waddell and Joseph B. Forman

[57] ABSTRACT

Increasing the through-put rate of data processing in an electronic printer by accepting incoming data at a rate which is a function of the variable print density of the incoming data being received.

16 Claims, 4 Drawing Figures

INVENTOR.
PAUL J. MORAN
BY Michael Masnik
HIS ATTORNEY

INVENTOR.
PAUL J. MORAN
BY Michael Masnik
HIS ATTORNEY

Patented June 12, 1973

3,739,350

3 Sheets-Sheet 3

INVENTOR.
PAUL J. MORAN
BY Michael Masnik
HIS ATTORNEY

HIGH-SPEED DATA PROCESSING SYSTEM

The present invention relates to electronic data processing and more particularly to methods and means for increasing the printing rate of electronic printers by varying the processing rates as a function of the print density of data being received from a remote source.

Printing systems exist today that have the capability of accepting data from a source at the normal printing speed of the printer. Such arrangements do not distinguish between printable and nonprintable functions which are desired to be executed. It would be desirable if the printing function could be carried out at the maximum design rate which is usually a built-in limitation — but that the processing of the nonprintable characters for the execution of the nonprintable function be carried at a higher rate.

A particular application for such a system exists in the case of a cathode ray tube display wherein signals representing printable and nonprintable characters are received and utilized to print a picture on the screen or face of the CRT. The incoming data is usually in alpha, numeric or other graphic forms. The data may be presented in the form of writing or a graphic picture, such as a graph, triangle design, etc. If it was desirable to provide a hard copy of say, for example, a triangle display, ordinarily one would be obliged to operate the printer in a conventional mode in which considerable time would be expended in horizontal spacing before the actual graphic mark is printed. That is, the spacing and character printing operations would be afforded essentially the same time increment for execution. It would be desirable to carry out the spacing functions at a much more rapid rate than the printing operation which is usually an inherent design limitation whereas the former is not. One could view this process as comparable to an automatic, unprogrammed, horizontal tabulating function. In order to provide this function, it is desirable that the incoming data be made available in parallel form to facilitate sensing for the purpose of determining whether printable or nonprintable characters are involved.

Accordingly, one object of this invention is to provide an improved apparatus for processing digital data comprising signals representing graphical characters for communicating information and also control characters for performing control functions associated with the graphical characters — all at a high rate of speed.

Another object of this invention is to provide a method and apparatus for varying the printing speed of an electronic printer inversely as a function of the print density.

Another object of the invention is to sense incoming data available in parallel form for printable and nonprintable characters and for controlling the processing of nonprintable characters at a much higher rate than printable characters.

Another object of this invention is to control the rate at which data is accepted such that the data receipt is delayed a given fixed amount if printable characters are involved, a smaller amount if nonprintable characters are involved, and a variable amount if a predetermined nonprintable character is involved where the variable amount depends on the time required to execute the function associated with the predetermined character.

Another object of this invention is to provide an improved data processing method and arrangement.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
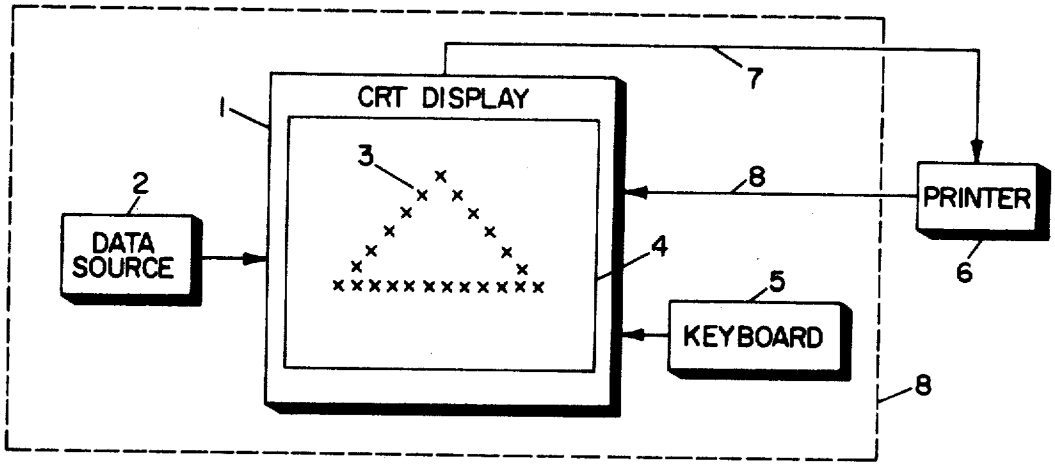
FIG. 1 shows in block diagram a system involving a CRT display operating with a printer wherein the invention would be applicable.

Referring to FIG. 1, there is shown a CRT display 1 which responds to data received from a source as, for example, 2, for displaying data, such as a graphical display 3, on the face of a screen 4 of CRT. Such displays may also be generated in response to operation of a keyboard 5 which generates alphanumeric or graphic symbols for display on the screen of the CRT. In the arrangement as described, it is oftentimes desirable to be able to print under the control of the operator a hard copy of the display appearing on the screen of the CRT. This is illustrated by a printer 6, such as an impact printer, which responds over line 7 to the data representing the display information which is stored in a storage circuit of display 1.

The input data available over line 7 in parallel form may generally be classified as either constituting printable or graphical characters representing information to be printed or communicated or nonprintable or control characters for controlling or performing control functions associated with the graphical characters. Representative of printable characters would be alphanumeric characters, punctuation marks, graphic symbols, etc. which are to be printed on a record medium. Representative of nonprintable characters would be, for example, space, line feed, form feed, vertical tab, shift-out, shift-in, and delete. These nonprintable signals are used to format the printable characters or to make the printing apparatus perform certain associated functions such as bell ring, etc. For purposes of discussion, one may consider use of the USA Standard Code for information interchange (ASCII), wherein binary numbers 1 through 33 and 128 represent the nonprintable characters, and binary numbers 34 through 127 represent printable characters. It will be assumed that the data signals are received in binary coded form, for example, in a 7 bit code wherein each bit is weighted logic 1 or logic 0. In the discussion, reference will be made to certain codes such as line feed 0101000, space 0000010, and delete 1111111. For reference purposes, use is made of the term "baud" in the application which signifies the number of bits per second at which the data is made available in serial form. For example, 1,200 baud would mean that 1,200 bits of data are received per second. Oftentimes, 10 bit positions are associated with a serially received character wherein the additional bits may be used to signify the start of a character, the stop of a character and a parity check. To convert a baud rate to a character rate, one merely would divide the baud rate by 10 so that 1,200 baud is convertible to mean 120 serial characters per second. Where data is transmitted in parallel form, as will be described hereafter, the start and stop bits are omitted. For simplicity, the parity bit is also omitted from the discussion.

The present invention has application to a printer arrangement wherein a partial line of characters may be simultaneously printed. Reference can be made to U.S. Pat. No. 3,568,183, filed July 9, 1968 by Jacob K. Snell, John J. Larew and Clifford M. Jones for an example of such a printer. Such an arrangement permits a higher printing rate than printers that print only a character at a time. The apparatus for the cited patent utilizes a type carrying belt that carries a number of flexible fingers, each of which has a type character on one end thereof. The number of fingers carried on the belt depends upon the number of characters or symbols the apparatus is to print. The type carried by the belt is continuously passed in a line across a record medium, such as paper. A plurality of hammers are located across a line of the record medium and are selectively operated to impact type fingers into the paper and thereby print up to a plurality of characters simultaneously. The position of each type character relative to a fixed point on the printer is determined by detecting the passage of a particular type character past that point and thereafter triggering a counting mechanism at a rate proportional to the rate of type character movement. As the type characters on the belt move past each possible column position on the recording medium, circuitry compares the instantaneous column position of the type characters on the belt, with the stored input data and the associated column information circulating in a memory to determine whether or not type characters are in position for printing. When this comparison indicates coincidence between characters on the belt and characters to be printed at that column, the hammer at that column position is actuated and drives the type finger toward the paper to cause the type face to impress a replica of the character thereon by means of an inked ribbon.

Figure 3:
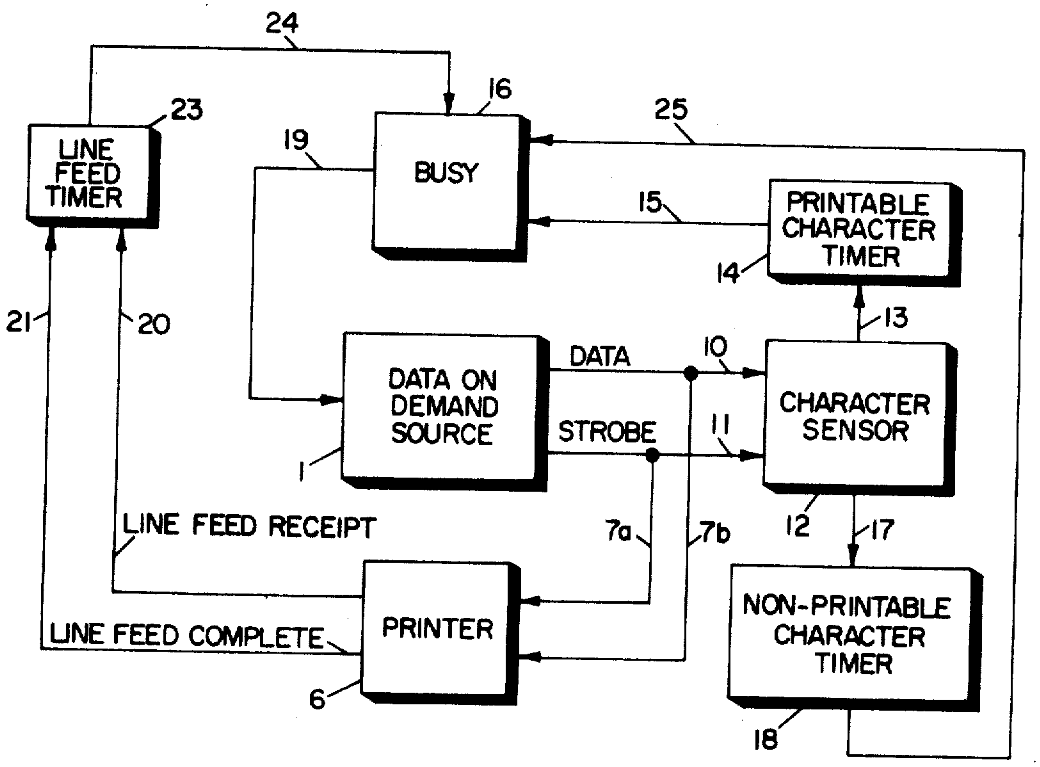
FIG. 3 illustrates in block diagram form one embodiment of the invention.

Referring to FIG. 3, there is shown an embodiment of the present invention wherein data available from source 1 is to be applied to the printer 6 under the control of additional circuitry which responds to the printable character density of data available over lead 10. For purposes of consistency, the data source 1 and printer 6 numerical designations have been retained. Block 1 is referred to as a data-on-demand source to indicate that the data can be transmitted from the source to the printer at a much faster rate than can be processed by the printer. Data flow from 1 to 6 is controlled by the busy gate 16. This gate normally responds to applied control signals, which shall be described, to develop a gate output at a logic state 1, signaling that the printer is busy and that the transmission of the next character from source 1 to printer 6 should be delayed. Under this condition, no new data is being transmitted to 10. Data is always available from 1 on output lead 10 and the associated lead 7. However, the data is not changed until the busy gate 16 is operated to a logic 0 output state. The data on lead 10 is presented in bit parallel, character serial form, for example, in the ASCII code format previously mentioned. Other signals available from source 1 are strobe signals of say 12 microseconds appearing on lead 11, each of which indicates that the character data on lead 10 is valid and should be accepted for processing. Let us assume that block 16 normally is blocking or disabling source 1 from sending new data over lead 10 in response to applied control signals which shall be described. Sensor 12 responds to the appearance of a strobe signal to analyze the data available on lead 10 and indicate whether it constitutes printable or nonprintable characters. If the data constitutes a printable character, a control signal is sent over lead 13 to the printable character timer 14. This generates a fixed time duration signal over lead 15 which maintains block 16 in the busy condition for a predetermined time interval, say 33 milliseconds, corresponding to the 30 characters per second printing rate of the machine. At the end of that timing period, block 16 goes to its non-busy state calling on source 1 to deliver the next data and strobe over leads 10 and 11 respectively. If the character sensor in this process should sense a nonprintable character, a control signal is applied over lead 17 to the nonprintable character timer 18. This generates a second fixed time duration signal over lead 25 which maintains block 16 in its busy state for a predetermined time interval, say 8 milliseconds, which represents the much lower processing time of the printer for nonprintable characters. There is an exception to this which will be described shortly. At the end of the timing period associated with block 18, the block 16 goes into its non-busy state calling for the next character and associated strobe signal to be presented.

In a particular application to be described, the output from 16 controlling the data flow from source 1 consituted a logic level 1 signifying a busy state and blocking transfer or transmission of data and associated strobe signals and a logic level 0 for a non-busy state. Thus, the printer 6 receives data from source 1 at different rates depending on the print density of the data. This operation results in a higher through-put than would be possible where all characters are processed at the maximum printing rate of the printer. Through-put can be defined as the average number of characters, both printable and nonprintable, which can be processed per unit of time by the printer. The printing rate is usually referred to as the maximum rate of printing printable characters assuming a continuous line of printable characters without spaces or line feeds or delays, etc.

Figure 2:
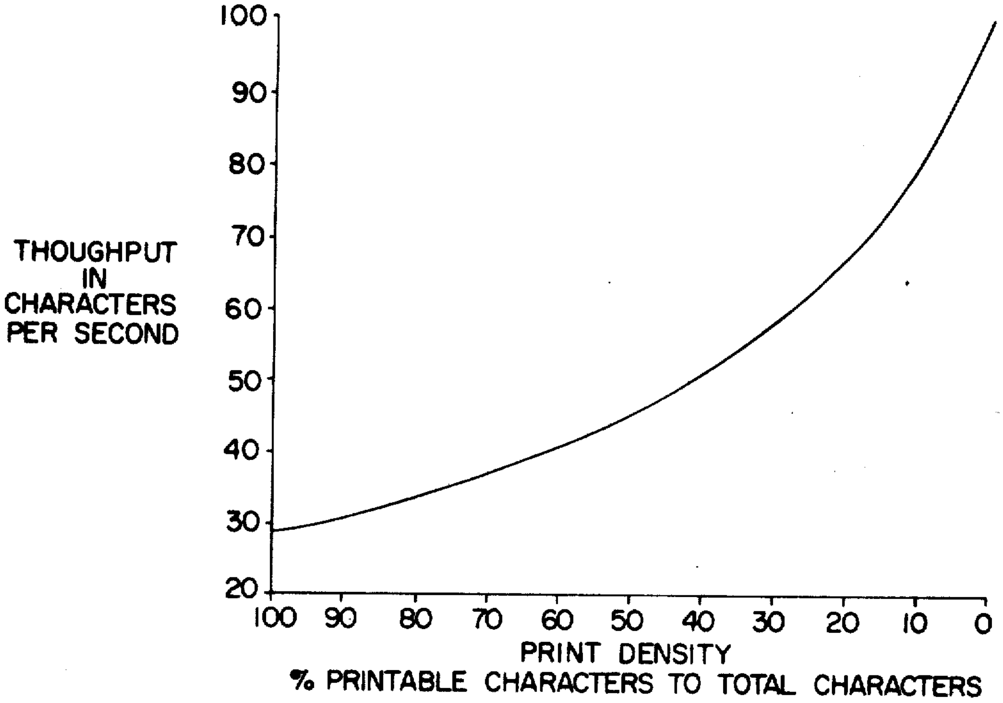
FIG. 2 illustrates in graphical form a feature of the present invention wherein it is desirable to vary the effective speed of printing in terms of characters printed per second as a function of the print density, that is, the ratio of printable to nonprintable characters in a communication.

Thus, referring to FIG. 2, it is seen that by providing arrangement for the control function described in FIG. 3, the through-put rate can be increased and varied in accordance with the print density from the maximum rate which, in the example shown in FIG. 2, is 30 characters per second.

The present invention also considers the fact that particular nonprintable characters may actually require a greater processing time than a printable character. For example, the nonprintable character which results in a line feed may require up to 350 milliseconds to be executed depending on the number of printable characters remaining to be printed before execution of the line feed. The printer has available a line feed receipt and a line feed complete signal on leads 20 and 21. Line feed timer 23 responds to the occurrence of a line feed receipt signal to initiate a variable duration timing signal on line 24. The line feed complete signal causes 23 to terminate the timing signal appearing on line 24. Since timer 23 has a longer time delay than timer 18, it will override the signal from 18 and cause the block 16 to remain busy in response to the signal available on lead 24 until the line feed is executed.

In a particular embodiment, timer 18 produced a time delay of 8 milliseconds for all control functions such as space, delete, etc . . . timer 14 produced a time delay of 33 milliseconds for executing the printing function and timer 23 produced the time delay which was variable up to 350 milliseconds in accordance with the variable time required to execute the predetermined control functions, such as line feed, vertical tab, form feed, etc. Thus, the printer 6 receives data at different data rates in accordance with the nature of the data available from the source 1.

Figure 4:
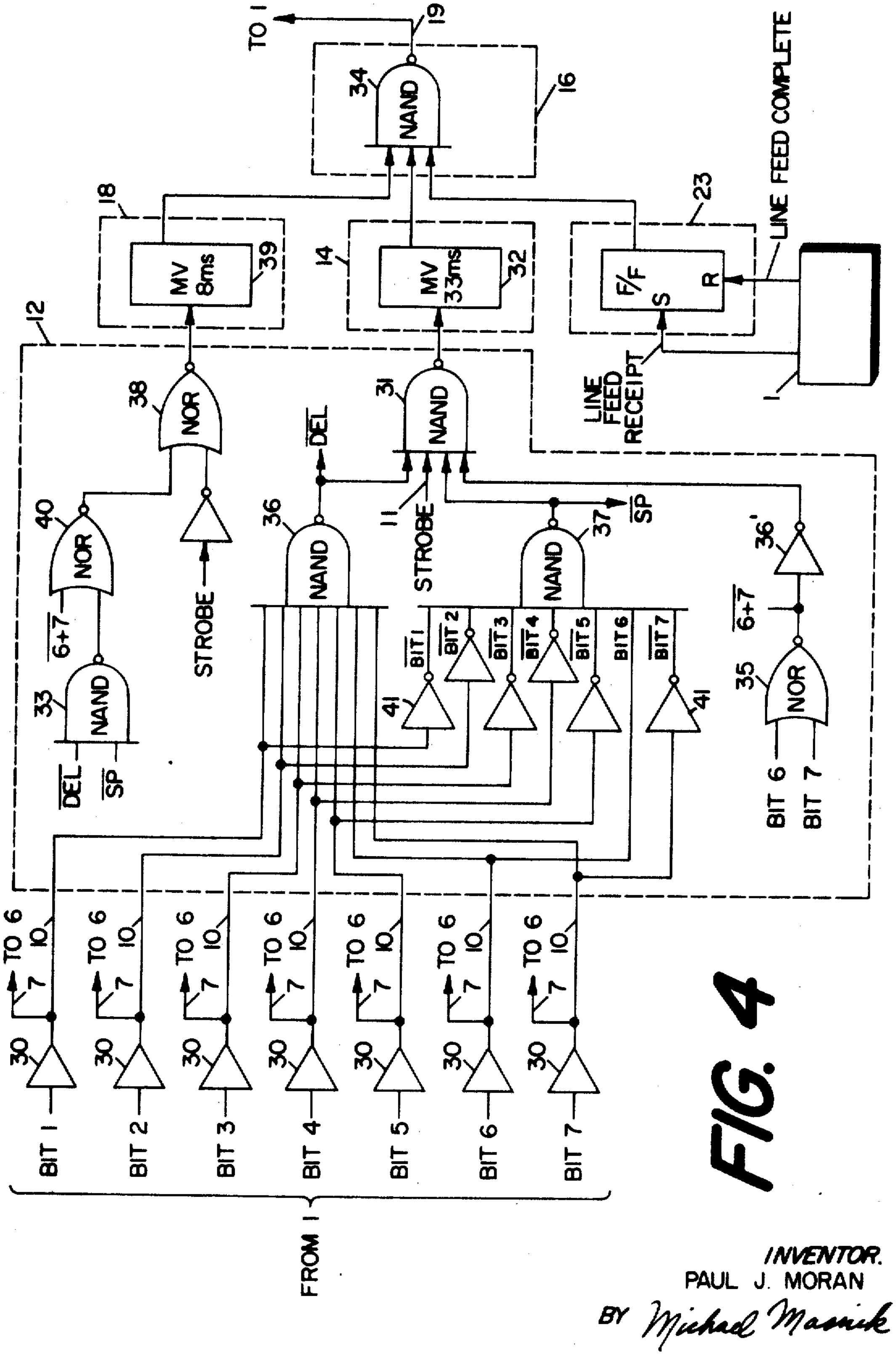
FIG. 4 illustrates in diagram form certain details of the invention shown in FIG. 3.

Referring to FIG. 4, there is shown in greater detail the operation of the control system which controls the rate of data flow from source 1 to printer 6 and illustrates in particular the details of the character sensor 12, the nonprintable character timer 18, the printable character timer 14, the line feed timer 23 and the busy function block 16. The 7 bits of data representing printable and nonprintable characters available from source 1 are applied through the respective level converters or drivers 30 to leads 7 for application to the printer 6 and to lead 10 for application to the character sensor 12. 30 adjusts the level without inverting the signal to match printer logic level requirement to source level requirements and forms no part of this invention. Character sensor 12 has also supplied to it the data strobe signal over lead 10. A printable character presents a logic 0 state at the output of NAND gate 31. This logic 0 state signal, when applied to the monostable multivibrator 32, produces a 33 millisecond timing signal for application to the busy function block 16. A NAND gate 34 of block 16 responds to the timing signal available from 32 to provide a busy signal to data source 1 over line 19 for the duration of the signal available from 32. This busy signal on lead 19 blocks further data from source 1 being applied to the printer 6 and to the character sensor 12.

In the ASCII code, a printable character is defined as having a logic 1 in the sixth and/or seventh bit position and it is not a space or it is not a delete signal. A space signal has the code 0000010 and a delete has logic 1 in all bit positions. Accordingly, NAND gate 31, in order to identify a printable character, has to identify a logic 1 in the sixth and/or seventh bit position, and also determine that the character is not a delete and is not a space. In addition, NAND gate 31 can respond to this set of conditions only when a data strobe signal appears on lead 11. NOR gate 35, in cooperation with the inverter 36', determines whether there is a level 1 state in the sixth and/or seventh bit position. NAND gate 36 determines that the character received is not a delete character by providing a level 1 state if it is not a delete and NAND gate 37 determines that the character being received is not a space. by providing a level 1 state if it is not a space. To provide level 1 state at the input of 36 signifying a non-delete input coming from source 1, one or more of the inputs would be at a zero level state since a delete signal is represented by the code 1111111. If all inputs to 36 are at level 1 state, block 36 produces a delete signal output which blocks gate 31. To provide a level 0 state signal at output of 37 signifying a space input coming from source 1, inverters 41 are provided to invert bit 1–5 and bit 7 channel positions to provide a reverse code of 1111111 with an input space signal 0000010 coming from source 1. To provide a level 1 state at the output of 37 signifying a non-space input from source 1, one or more of the inputs would be at a zero level state. Under these circumstances, all of the inputs to NAND gate 31 will be at a logic 1 state to cause the multivibrator 32 to generate a 33 milliseconds timing pulse.

To determine whether a nonprintable character is involved, NOR gate 38 responds to a nonprintable character to produce a logic state 1 at its output. Monostable multivibrator 39 responds to the logic 1 state to produce an output timing pulse of 8 milliseconds duration. The busy function block 16 responds to this timing signal for its duration to block the transmission of further characters from source 1 to the printer 6. In order for NOR gate 38 to produce a logic state 1 at its output, the following conditions must be met. You do not have a logic 1 state in bit 6 or bit 7 position, or you have a delete or a space signal, and in all cases a data strobe occurs. A not 6 or 7 signal applied to NOR gate 40 is available from the NOR gate 35 and the not delete and not space signal are available from NAND gates 36 and 37 by way of NAND gate 33. NOR gate 40 responds to these conditions to produce a logic 0 state at its output. NOR gate 38 responds to the logic 0 state available from NOR gate 40 and the inverted data strobe signal at a 0 state to produce the logic 1 state indicating that a nonprintable character has been detected.

The system operates in the manner indicated permitting more rapid processing of the nonprintable characters than the printable characters and thereby increasing the through-put of the overall system. As previously mentioned, however, to execute the line feed, a variable time period may be involved which may range in a particular case from 8 to 350 milliseconds. The system is arranged so that in the event a line feed signal is received at the printer, the further data transmission from source 1 to printer 6 is blocked until the line feed function has been executed. This feature has found particular application in a printer arrangement which is described in patent application Ser. No. 91,160 dated Nov. 19, 1970 entitled "Print Selection System" and assigned to the common assignee. In this printer, incoming printable characters are stored in a circulating memory in a manner which enables more than one character to be printed at a time. The arrangement, therefore, operates as a partial line printer. Under these circumstances, if a plurality of data is circulating in the printer memory, and the line feed signal is received, further data transmissions from source 1 to printer 6 are blocked until all of the printable characters in memory have been printed and the line feed executed. Thus, the line feed timer 23 operates as an override on the timer 18.

Referring to FIG. 4, the timer 23 may comprise a flip-flop having a set and reset input lead and an output lead which connects to the NAND gate 34. The flip-flop of timer 23 responds to a signal over its set lead representing the detection or start of a line feed to start the generation of a timing pulse which continues until a signal is applied to the reset terminal indicating that the line feed has been completed. Thus, the duration of this timing signal depends on the occurrence of the line feed receipt and line feed complete signals. This timing signal of variable duration applied to the NAND gate 34 produces a busy signal for the duration of the variable time. It should be noted that since the line feed constitutes a nonprintable character, it will also be sensed by sensor 12 to operate timer 18. However, since the line feed timer signal will generally be of longer duration than the timer 18, it will control the operation of the busy function block 16. Under normal circumstances, since the line feed signal received from source 1 will undergo some time delay in processing in printer 6, the nonprintable character timer will start the busy signal over lead 19 but the busy signal will remain for the balance of the time established by the line feed timer 23.

While the invention has been described as applicable to a CRT display — it is applicable to other types of data storage sources, such as paper tape readers, magnetic tape readers, computer storage, etc. — where data is made available in parallel bit form. The invention constitutes an improvement over the method used in application Ser. No. 789,841 filed Jan. 8, 1969 by Paul J. Moran and John J. Larew and assigned to the common assignee. In that application, a tape reader provided commands such as line feed, carriage return, etc. which required a longer time to execute than other commands. To avoid the need for using fill characters on the tape to provide the necessary delays following receipt of say a line feed — the cited application proposed initiating an electronic time delay of sufficient duration to accommodate the period for execution of the line feed. During this time delay period, it was possible to continue reading characters from the tape as long as the characters were nonprintable characters. If a printable character was reached, then further reading of the tape was halted until the electronic time delay period had elapsed.

In the present invention, data is permitted to be received at a rate depending on the print density. Nonprintable characters are processed at a rate much higher than the printing rate of the printer which normally would be a limitation. Also, a line feed interposed not a fixed delay representing a worst condition, but a variable delay which terminates as quickly as the line feed is executed following printing of all previously received printable characters.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed as new and desired to be secured by Letters Patent of the United States is:

1. In combination, a source of digital data comprising signals representing graphical characters and control characters, a data processor, means for serially transmitting character data from said source to said processor at a high rate, means responsive to receipt of a transmitted control character for enabling transmission of the next character after a first time period, means responsive to receipt of a transmitted graphical character for enabling transmission of the next character after a second time period of longer duration than said first time period to permit a longer time for processing of said graphical character, and means responsive to receipt of at least one predetermined control character for enabling transmission of the next character after a third time period of longer duration than said second time period to permit a still longer time for the control function represented by said predetermined control character to be executed.

2. In an arrangement wherein digital data comprising signals representing graphical characters and control characters are capable of being transmitted from a source to a processor at a high rate, means responsive to receipt of a transmitted control character for blocking transmission of the next character for a first time period, means responsive to receipt of a transmitted graphical character for blocking transmission of the next character for a second time period of longer duration than said first time period to permit a longer time for processing of said graphical character, and means responsive to receipt of at least one predetermined control character for blocking transmission of the next character for a third time period of longer duration than said second time period to permit a still longer time for the control function represented by said predetermined control character to be executed.

3. In an arrangement wherein digital data comprising signals representing graphical characters and control characters are capable of being transmitted from a source to a printer at a high rate, means responsive to receipt of a transmitted control character for blocking transmission of the next character for a first fixed time period to permit execution of the control function associated with said control character, means responsive to receipt of a transmitted graphical character for blocking transmission of the next character for a second time timer period of longer duration than said first time period to permit printing of said graphical character, and means responsive to receipt of at least one predetermined control character for blocking transmission of the next character for a third time period having a variable duration sufficient to permit the control function represented by said predetermined control character to be executed.

4. An arrangement according to claim 3 wherein said last mentioned means initiates the blocking of transmission of the next character in response to receipt of said at least one predetermined control character and terminates said blocking in response to the receipt of a signal indicating the control function represented by said last named control character has been executed.

5. An arrangement according to claim 4 wherein said at least one predetermined control character is selected from the family comprising line feed, vertical tab or form feed.

6. In an arrangement wherein graphical characters and control characters are transmitted in bit parallel, character serial form from a source to a printer at a high rate, means responsive to receipt of a transmitted control character for delaying transmission of the next character for a first time period to permit execution of the control function associated with said control character, means responsive to receipt of a transmitted graphical character for delaying transmission of the next character for a second time period of longer duration than said first time period to permit printing of said graphical character.

7. In an arrangement wherein graphical characters and control characters are transmitted in bit parallel, character serial form from a source to a printer at a high rate together with a strobe signal associated with each character to indicate when the character is in acceptable form for receipt by the printer, means responsive to receipt of a transmitted strobe signal for analyzing the binary states of the associated transmitted character to provide a signal identifying such character as a printable or a control character, means responsive to a control character identifying signal for delaying transmission of the next character for a first time period to permit execution of the control function associated with said control character, means responsive to a printable character identifying signal for delaying transmission of the next character for a second time period of longer duration than said first time period to permit printing of said graphical character.

8. An arrangement according to claim 7 comprising means responsive to receipt of at least one given control character for delaying transmission of the next character and responsive to the execution of the control function associated with said given control character for enabling the transmission of such next character.

9. In an arrangement wherein graphical characters and control characters are transmitted in bit parallel, character serial form from a source to a printer at a high rate compared to the printing rate of the printer together with a strobe signal associated with each character to indicate when the character is in acceptable form for receipt by the printer, means responsive to receipt of a transmitted strobe signal for analyzing the binary states of the associated transmitted character to provide a signal identifying such character as a printable or a control character, means responsive to a control character identifying signal for delaying transmission of the next character for a short time period which is short compared to the printing rate of the printer but long compared to said high rate of character transmission to permit execution of the control function associated with said control character, means responsive to a printable character identifying signal for delaying transmission of the next character for a time period of longer duration than said short time period to permit printing of said graphical character, and means responsive to receipt of a line feed character for initiating a delay in the transmission of the next character and responsive to the execution of the line feed for enabling the transmission of said last-named next character.

10. In an arrangement wherein graphical characters and control characters are transmitted in bit parallel, character serial form from a source to a printer at a high rate together with a strobe signal associated with each character to indicate when the character is in acceptable from for receipt by the printer, means responsive to receipt of a transmitted strobe signal for analyzing the binary states of the associated transmitted character to provide a signal identifying such character as a printable or a control character, means responsive to a control character identifying signal for delaying transmission of the next character for a first time period to permit execution of the control function associated with said control character, means responsive to a printable character identifying signal for delaying transmission of the next character for a second time period of longer duration than said first time period to permit printing of said graphical character, and means responsive to receipt of a line feed character for delaying transmission of the next character until all previously received graphic characters have been printed and the line feed has been executed.

11. In combination a source of data comprising first signals representing graphic characters to be recorded within a first time interval, second signals representing non-graphical characters to be used in performing control functions associated with the graphic characters within a second time interval and third signals representing special non-graphic characters to be used in performing special control functions associated with the graphic characters within a third time interval, means for receiving data from said source, means for sensing said received data to provide sensed first, second or third signals, means responsive to a sensed first signal for causing printing of the corresponding character within a first time interval, means responsive to a sensed second signal for causing the control function associated therewith to be executed within a second time interval and means responsive to a sensed third signal for causing the control function therewith to be executed within said third time interval.

12. An arrangement according to claim 11 wherein said second and third time intervals are of fixed duration and said third time interval is of variable duration corresponding to any differences in time required to execute the control function associated with said third signal.

13. An arrangement according to claim 11 wherein said second time interval is of shorter duration than the first time interval and the third time interval is greater than said second time interval.

14. In an arrangement wherein data comprising first signals representing graphic characters to be recorded, second signals representing non-graphic characters to be used in executing control functions associated with said graphic characters, and third signals representing special non-graphic characters to be used in executing special control functions associated with said graphic characters is arranged to be transmitted from a data source to be received by a recording means, means for sensing received data to provide sensed first, second and third signals, means responsive to sensed second or third signals for blocking transmission of any immediately following data for at least a second time interval, means responsive to sensed third signals for changing the interval of blocking of transmission of any immediately following data from said second to a third time interval, and means responsive to sensed first signals for blocking transmission of any immediately following data for a first time interval.

15. An arrangement according to claim 14 wherein said means for changing said interval of blocking comprises means for varying the duration of said third time delay to account for differences in time required for executing the control function associated with said third sensed signal.

16. In combination a printer, a source of data comprising first signals representing graphic characters, second and third signals representing non-graphic characters to be used in performing control functions associated with the graphic characters, means for transmitting data from said source to be received by said printer, sensing means responsive to received first signals to block transmission of immediately following data for a first time interval, to permit said printer to print said first signals, sensing means responsive to received second signals for blocking transmission of any immediately following data for a second time interval of fixed duration which is of shorter duration than said first time interval to permit said printer to perform the control functions associated with said second signals, sensing means responsive to received third signals for blocking transmission of any immediately following data for a third time interval, and means for varying the duration of said third time interval to account for differences in time required to perform the control function associated with said third signals.

* * * * *

UNITED STATES PATENT OFFICE
CERTIFICATE OF CORRECTION

Patent No. 3,739,350 Dated June 12, 1973

Inventor(s) Paul J. Moran

It is certified that error appears in the above-identified patent and that said Letters Patent are hereby corrected as shown below:

Column 8, lines 33 and 34, after "second" cancel "time timer" and insert -- fixed time --

Signed and sealed this 26th day of March 1974.

(SEAL)
Attest:

EDWARD M.FLETCHER,JR.
Attesting Officer

C. MARSHALL DANN
Commissioner of Patents